April 21, 1942.   N. G. KOPPINGER   2,280,413
SURFACE ORNAMENTING MACHINE
Filed July 19, 1939   6 Sheets-Sheet 1

INVENTOR
Nicholas G. Koppinger.
BY
Dike, Calver & Gray
ATTORNEYS

April 21, 1942.　　　N. G. KOPPINGER　　　2,280,413
SURFACE ORNAMENTING MACHINE
Filed July 19, 1939　　　6 Sheets-Sheet 2

INVENTOR
Nicholas G. Koppinger
BY Dike, Calver & Gray
ATTORNEYS

April 21, 1942.  N. G. KOPPINGER  2,280,413
SURFACE ORNAMENTING MACHINE
Filed July 19, 1939   6 Sheets-Sheet 3

INVENTOR
Nicholas G. Koppinger.
BY
Dike, Calver & Gray
ATTORNEYS

Patented Apr. 21, 1942

2,280,413

UNITED STATES PATENT OFFICE 2,280,413

SURFACE ORNAMENTING MACHINE

Nicholas George Koppinger, St. Clair Shores, Mich., assignor to Briggs Manufacturing Company, Detroit, Mich., a corporation of Michigan Application July 19, 1939, Serial No. 285,373

9 Claims. (Cl. 101—36)

This invention relates to surface ornamenting or decorating machines, and more particularly to machines for applying surface ornamentations such as a wood graining finish to curved metal surfaces such, for instance, as metal moldings for windows of motor vehicle bodies.

One of the objects of the present invention is to provide a surface ornamenting or decorating machine which can apply a desired design or ornamentation to a curved surface without distorting such design, particularly in places where the curvature of the surface changes at an increased rate, such as for instance in corners.

Another object of the invention is to provide a machine of the character specified in the preceding paragraph, which enables applying the desired ornamentation economically and at a rate acceptable for quantity production.

Still another object of the invention is to provide a surface decorating machine which may be easily and safely operated by an unskilled worker.

A further object of the invention is to provide an improved surface ornamenting or decorating machine which can be loaded and unloaded in operation very conveniently and without strenuous effort on the part of the operator.

A still further object of the invention is to provide an improved surface ornamenting or decorating machine which is capable of quantity production and which occupies only a small space, a plurality of such machines capable of being grouped closely together, operating of adjacent machines being possible without interference.

A still further object of the invention is to provide an improved surface decorating machine for applying a wood graining finish to window frames or moldings for automobile bodies, the construction of said machine being such that a generally rectangular molding can be easily inserted in a machine and operated upon, and thereupon conveniently removed from the machine.

A still further object of the invention is to provide an improved surface ornamenting machine in which means are provided to effect the engaging movement of the workpiece to the design transfer belt in a direction substantially perpendicular to the engaging surfaces of the workpiece and the belt.

A still further object of the invention is to provide an improved surface ornamenting machine having a work supporting table which is adapted to be securely locked during the ornamenting or printing operation.

A still further object of the invention is to provide an improved surface ornamenting machine in which the entire control of the work table and the workpiece, which are moved independently of each other during a portion of the operative movement, is attained with a single pedal and the operator does not have to change feet or to move his foot from one pedal to the other.

A still further object of the invention is to provide a surface ornamenting machine having an inking roller, in which machine improved means are provided to permit adjustments for varying the amount of paint or printing ink received by said roller for transfer to the belt.

A still further object of the invention is to provide a surface decorating machine having a transfer belt and an inking roller, means being provided to control the amount of ink actually transferred from the roller to said belt.

It is an added object of the present invention to provide an improved surface decorating machine of the foregoing character, which machine is relatively simple in construction, safe and dependable in operation, has a high production capacity, and is relatively inexpensive to manufacture and service.

Other objects of this invention will appear in the following description and appended claims, reference being had to the accompanying drawings forming a part of this specification, wherein like reference characters designate corresponding parts in the several views.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there is shown, by way of example, a surface decorating or ornamenting machine embodying the present invention. The machine illustrated in the drawings and hereinafter described is constructed especially for applying surface ornamentation to automobile window moldings, which ornamentation is usually in the form of a wood graining finish. It will be understood, however, that the machines embodying the present invention are not limited for the above use and may be successfully used for applying ornamentations to other articles or workpieces, particularly those having curved or irregular surfaces.

Figure 1:
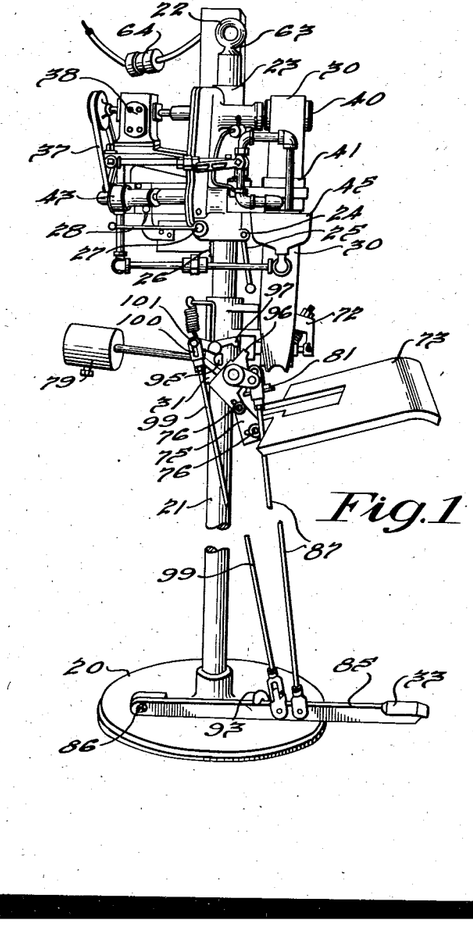
Fig. 1 is a perspective view of the machine embodying the present invention, the observer looking from the left-hand side of the machine.
Figure 2:
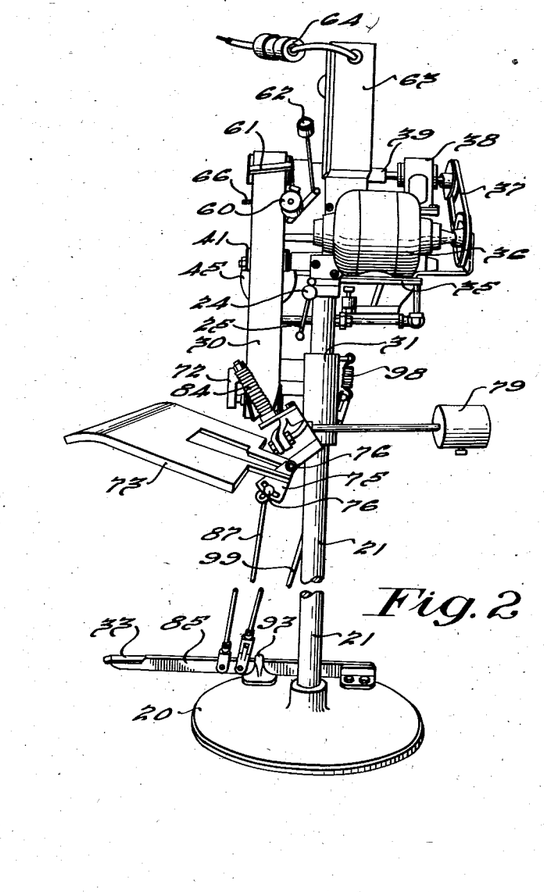
Fig. 2 is a perspective view of the machine shown in Fig. 1, the observer looking from the right-hand side thereof.
Figures 3, 4:
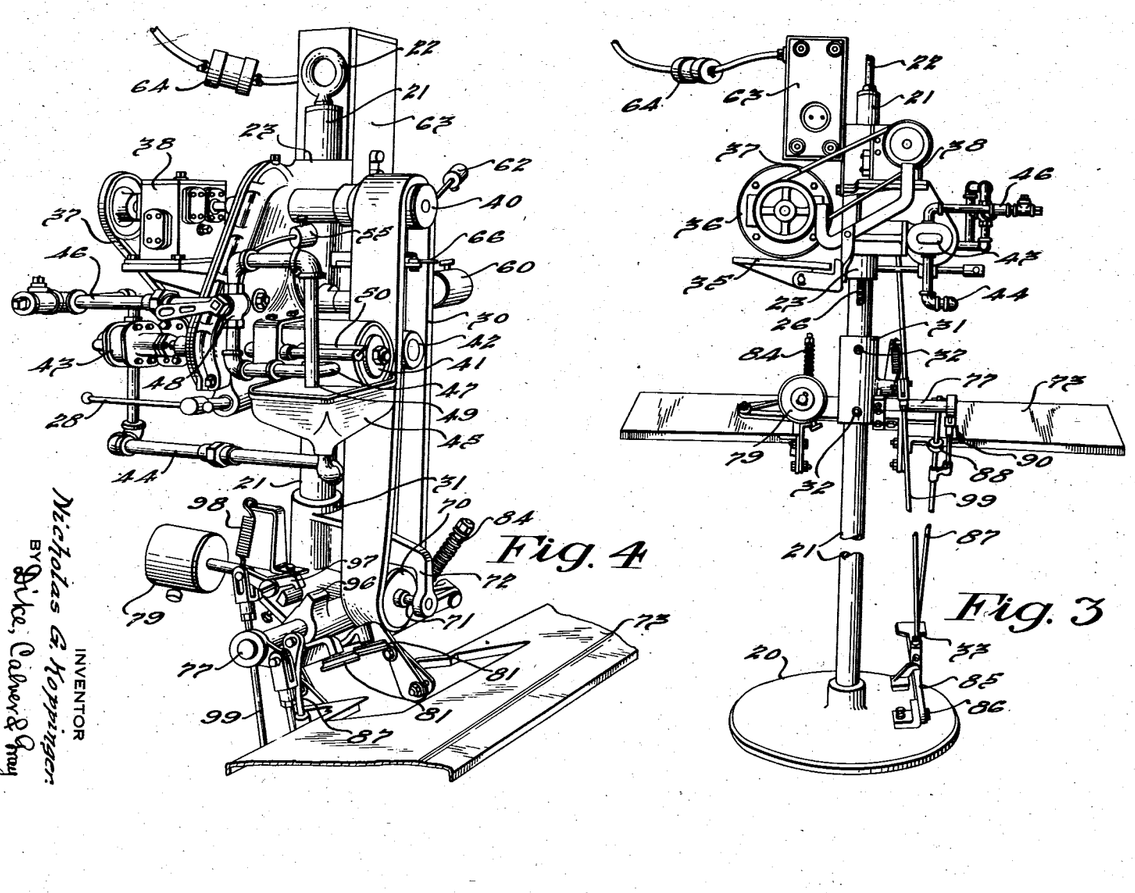
Fig. 3 is a rear view of the machine.
Fig. 4 is a perspective view of the upper portion of the machine, the observer looking on the front left-hand corner thereof.

Referring to the drawings and particularly to Figs. 1 to 3 inclusive, the machine illustrated therein comprises generally a base 20 preferably of a circular form, in which there is affixed an upstanding standard 21 which serves as a main frame or skeleton member on which the entire mahcine is assembled. To the upper end of said standard 21 there is secured in any suitable manner a ring or eyelet 22 by which the entire machine may be raised with the use of a crane for transporting the machine about the plant.

The operative mechanisms of the machine may be divided structurally into three parts in accordance with the way in which they are mounted; the upper portion including the drive, the inking roller and the driving pulley for the transfer belt; the lower portion including the form roller, the work supporting table and the associated mechanisms; and, the pedal mounted on the base 20.

The upper portion comprises a sleeve 23 fitting on the standard 21, wihch sleeve is split for a portion of its length and may be drawn together to grasp the standard, with the aid of a screw 24 (see Figs. 1 and 2) provided with a handle 25 for easier operation. The standard 21 is provided with a rack 26 cooperating with a gear (not shown) carried by a member 27 provided with a handle 28. When it is desired to raise or lower the upper portion, such as for removal of the transfer belt 30, the handle 28 is taken hold of and the screw 24 untightened. Thus, the upper sleeve 23 is made free to move up and down on the standard 21, and such motion thereof may be effected by rotating the handle 28 in the corresponding direction. For steadying the sleeve 23 on the standard 21, the screw 24 is tightened by rotating the handle 25.

The mechanisms comprised by the lower portion of the machine are assembled on the sleeve 31 which is similar in its operative purport to the sleeve 23, the difference being in the fact that the sleeve 31 is provided with positioning screws 32 and has no rack-and-gear means for raising and lowering the entire lower portion, provision of which is not necessary since said lower portion is positioned permanently for a definite type of work and the height of the operator. Changing the poistion of the lower portion would require changing the length of the rods connecting the mechanisms of said lower portion with the pedal 33.

The upper portion of the machine comprises generally a pulley for driving the transfer belt, an inking roller for transferring the dyeing pigment of a predetermined pattern to the transfer belt, means for supplying ink to the inking roller, and scraper means for removing the excess ink from the inking roller, as well as scraper means for cleaning the transfer belt. The upper portion also carries means for driving said pulley, the inking roller and the ink supplying means. The lower portion includes a form roller over which the transfer belt passes, which form roller generally conforms to the cross sectional shape of the molding; a swinging table for supporting the molding in its operative position; guide rollers for guiding the workpiece during the printing operation and maintaining the contact between said workpiece and the transfer belt; and means for locking the swinging table in the supporting position. On the base 20 there is mounted the pedal 33 which operates the mechanisms carried by said lower portion.

Referring particularly to the drawings, there is provided on the upper sleeve 23 a platform 35 on which there is mounted an electric motor 36 drivingly connected by means of a belt 37 with a speed reducing box 38 of any suitable construction. On the continuation of a shaft 39 of the speed reducing box 38 there is mounted a driving pulley 40. The shaft 39 is connected by means of a train of gears, indicated in Fig. 13, with the shaft of the inking roller 41. I prefer to have the driving pulley 40 and the inking roller 41 to operate at the same rotative speed. In order to prevent slippage of the belt 30 at the inking roller 41, the sizes of the driving pulley and the inking roller have to be properly selected. I prefer to have an inking roller which has a radius equal substantially to the sum of the radius of the driving pulley 40 plus the thickness of the belt. A small correction of the above geometric calculation may be necessary in order to provide for slight compression of the transfer belt between the inking roller 41 and a pressure roller 42, as well as for the slight stretching of the relatively heavy belt 30 due to the centrifugal force of operation.

The inking roller 41 is in the form of a cylinder, on the outside surface whereof there is provided the desired pattern or design. Good results are attained with the use of copper inking rollers having a pattern or image provided on the surface thereof by the well known photoengraving process commonly used in the art of printing. In this case a wooden board of the corresponding size is first finished to show its grain and is thereupon photographed for the purpose of producing the image on the inking roller. In order to prevent rapid wearing out of the engraved copper surface of the inking roller 41, it is chromium plated to provide a better wearing surface. The image or design on the roller 41 is produced by minute depressions or indentations of varying sizes, which depressions retain the printing ink. When a relatively soft belt comes in contact with the surface, the ink retained in said depressions is partly transferred onto the surface of the belt.

Means for supplying ink to the inking roller comprise, in the present embodiment, a rotary pump 43 driven by a shaft forming a continuation of the shaft of the inking roller 41. The intake side of the pump 43 is connected by means of a pipe 44 composed of a plurality of sections to produce proper turns, with a reservoir 45 which serves as an overflow and a supply reservoir. The discharge side of the pump 43 is provided with a pipe connection 46 having a discharge nozzle 47 adapted to discharge the ink in a thin wide stream onto the surface of the rotating inking roller 41. A plug valve 48 is provided in the pipe 46, which valve has a branch leading to the overflow pipe 49. By virtue of the provision of the valve 46 it is possible to regulate within desired limits the amount of ink delivered to the inking roller, or to direct the entire ink stream through the pipe 49 into the overflow reservoir.

Figures 12, 13, 14:
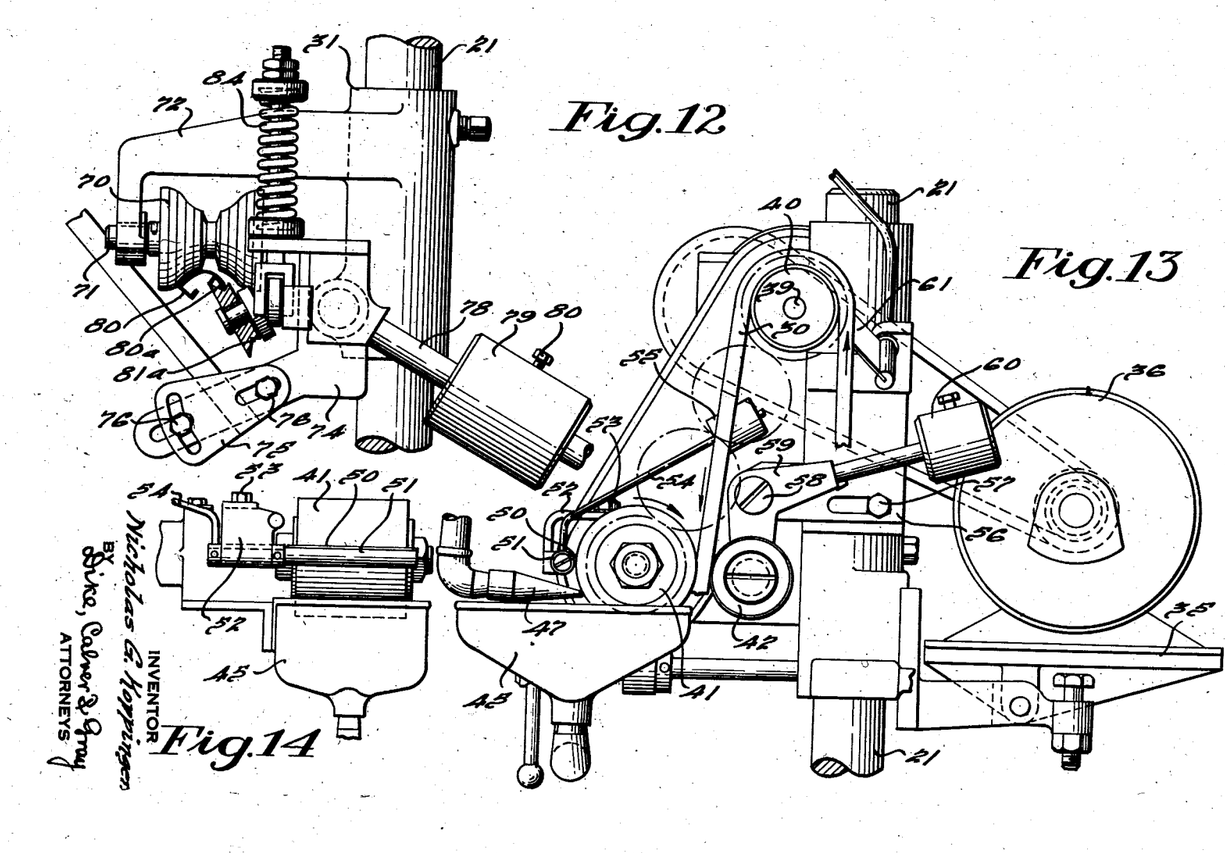
Fig. 12 is a side view of the structure shown in Fig. 10.
Fig. 13 is a view showing the upper portion of the machine, the observer being presumed to look from the front thereof, said view illustrating the inking roller, the transfer belt and the driving means therefor.
Fig. 14 is a fragmentary view illustrating the inking roller and the scraper therefor.

The ink delivered by the discharge nozzle 47 covers the surface of the inking roller completely and being of a certain density it forms on the surface of the inking roller a layer of a considerable thickness. Therefore, means are provided to scrape off the excess paint from the surface of the inking roller and to leave the ink only in the above mentioned depressions or indentations. In the present embodiment the scraping means are in the form of a thin blade 50 secured in a shaft 51 journalled in a bracket 52. The bracket 52 is secured by means of screws 53 to the extension provided on the sleeve 23, the holes in said bracket 52 being larger than is necessary for the passage of the shanks of the screws 53. A bent rod 54 is secured to the shaft 51, as is best shown in Figs. 13 and 14, and is provided with an adjustable weight 55 which tends to rotate the blade in the direction to press said blade against the surface of the inking roller. As the roller rotates the scraper blade 50 scrapes off the ink from the surface thereof leaving the ink only in the pattern indentations. By virtue of the provision of the adjustable bracket 52 the scraper blade may be moved toward and away from the inking roller 41 changing the angle at which the scraper blade 50 contacts the surface of the inking roller. Changing this angle enables varying the quantity of ink which is left on the inking roller and, therefore, it enables transferring more or less ink to the transfer belt 30, thereby making the design transfer to the workpiece either heavier or lighter as the circumstances may require. The blade 50 may also be moved with the aid of the adjustments of the bracket 52 to give uniform pressure on the roller 51 along the entire length of the blade 50. This feature is very important, since in some prior structures of this general character there was no means for adjusting the blade to correct the design which would come out heavier on one side.

Figures 7, 8:
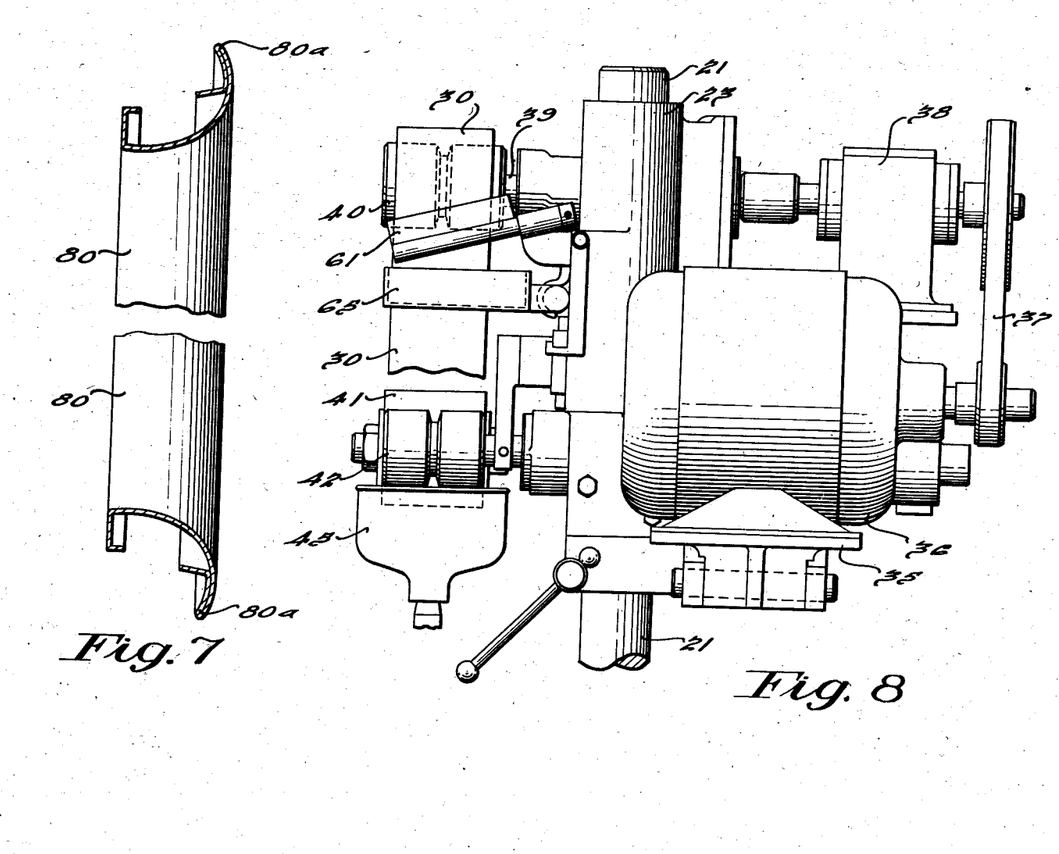
Fig. 7 is a transverse sectional view of the molding illustrated in Fig. 6, section being taken on the section plane passing through the line 7—7 of Fig. 6.
Fig. 8 is a view illustrating the upper portion of the machine, the observer being presumed to look from the right-hand side of the machine.

The pressure roller 42 is swingingly mounted on the bracket 56 adjustable with respect to the roller 41 by means of a screw 57. The bracket 56 carries a screw 58 serving as a hinge for a bent arm 59 one end of which carries the pressure roller 42 while on the other end there is provided an adjustable weight 60. By moving the weight 60 toward or away from the hinge 58 the pressure which the roller 42 exerts on the belt 30 may be adjustably varied. Changing this pressure varies the amount of ink which is transferred to the belt 30, which, in turn, tends to produce heavier or lighter design on the workpiece. In the case when lighter design is produced on the workpiece, more untransferred ink is left on the transfer belt 30 and, therefore, it is necessary to have means which remove the ink left on the transfer belt 30 after it contacts the workpiece and before it comes in contact with the inking roller 41 for receiving a new impression. Said means are exemplified in the present embodiment of the invention by a scraper 61 which is best shown in Figs. 13 and 2. The scraper 61 is mounted similarly to the scraper 50 and is provided with an adjustable weight 62 serving the purpose similar to that of the weight 55. The amount of ink which is removed by the scraper 61 is relatively small and it may be wiped from the scraper 61 from time to time. It may be advisable to provide a small container under the scraper 61 if light designs are produced by the machine most of the time. Such a container is shown in Fig. 8 and is indicated therein by the numeral 65. For cleaning the sides of the belt 30 there are provided side scrapers 66 best shown in Figs. 2, 4 and 5.

A switch box 63 is also mounted on the upper portion of the machine, which box is provided with a plug connection 64 for connecting the machine with a source of electric current for operating the motor 36.

Figure 9:
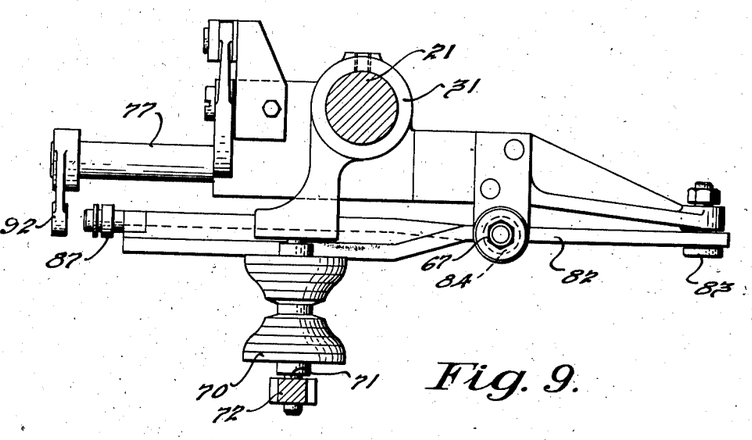
Fig. 9 is a top view illustrating the form roller and the mounting thereof, the subassembly including the same being shown removed from the machine.

The lower portion of the machine is mounted on the sleeve 31 as mentioned. Said lower portion comprises a form pulley or roller generally indicated by the numeral 70 which is mounted on a shaft 71 floatingly journalled in a bracket 72 provided on the sleeve 31. The roller 70 is of a laminated construction. It comprises a plurality of disks as is best shown in Fig. 9, and is shaped to the general form of the cross section of the workpiece. The disks forming the form roller 70 may rotate at different speeds without interfering with each other or causing slippage of the belt thereon. By virtue of its laminated construction and certain amount of axial floating, the form roller 70 automatically adjusts itself and prevents distortion of the pattern transferred to the belt 30 by the inking roller. The belt 30 is passed over the driving roller 40 and the form roller 70 and the tension of said belt is adjusted with the aid of the gear-and-rack means 26 and 27 operated with the aid of the handle 28 to change the elevation of the upper portion of the machine. The same means are resorted to in order to permit removal of the belt for repairs or inspection. The belt 30 is of a type generally used in printing work. It comprises generally a base made of a material capable of sustaining the upper layer of a glue and gelatin composition providing a smooth pigment-receiving surface.

A swinging table 73 is secured to the brackets 74 through the adjustment plates 75 (see Fig. 12) with the aid of which the position of said swinging table with relation to the form roller may be varied by loosening the screws 76, moving the table through a predetermined distance and retightening said screws. The brackets 74 are secured to the shaft 77 journalled in a suitable extension of the sleeve 31. To the brackets 74 there is secured an arm 78 on the end of which there is provided an adjustable weight 79 which may be adjustably moved along said arm and fixed in a desired position by means of a set screw 80. The weight 79 is heavier than the table and, therefore, it always tends to maintain the table 73 in its raised or upper position, external means being provided for bringing the table into its lower position.

In some prior machines of this general character the table was made stationary and fixed in a position corresponding to the raised position of my swinging table. With such stationary tables a workpiece, such as a frame molding, would have to be put into its position over said raised table, which was very tedious and would tire out the operator after only a few hours of work. In addition, it was unsafe to bring such fixed table too close to the form roller, since it might produce smearing of the molding or the image transferred thereto. Therefore, the means which brought the workpiece into actual contact with the transfer belt had to travel through a considerable distance (of one inch or more) which made slippage of the molding from the guide rollers possible.

In my improved machine the molding is first laid flat on the table, whereupon the table is swung into a position in which the molding comes within less than one-half inch from the transfer belt. Through this distance of less than one-half inch, which is hereinafter termed "the clearance," the workpiece travels substantially perpendicular to the surface of the transfer belt and, therefore, when it comes into contact with said belt, no slippage of the mating surfaces occurs, thus giving a quick and reliable contact for producing a clear undistorted image which is printed on the workpiece by the belt. The actual contact between the workpiece which is indicated in the drawings by the numeral 80 and the transfer belt is effected with the aid of guide rollers 81 which are provided with grooves 81a receiving the edge 80a of the workpiece 80 along which the rollers move as along a rail. It is to be understood, however, that the rollers 81 are stationary and it is the molding that is manually moved past the transfer belt at the form roller until the entire length of the workpiece 80 is printed upon.

Figure 10:
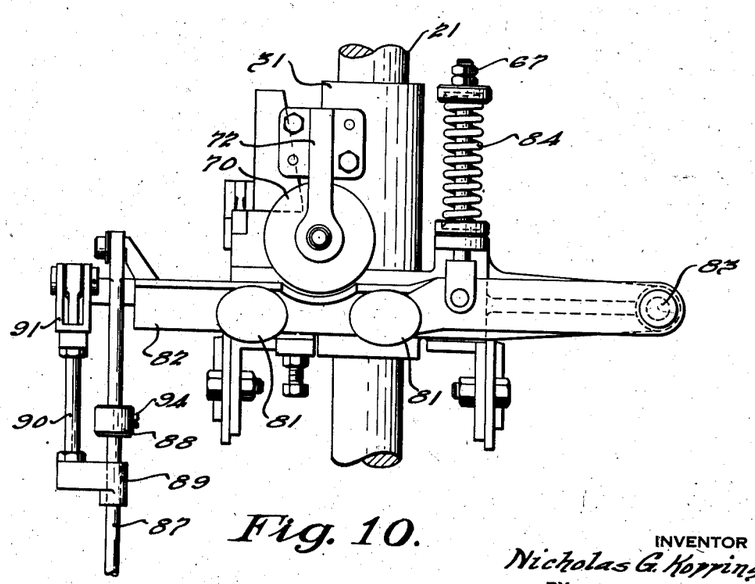
Fig. 10 is a fragmentary front view illustrating the form roller, the guide rollers and the means for operating the same.

Means for operating the guide rollers 81 are exemplified by a bar 82 which is shown in detail in Figs. 9 and 10. The bar 82 is hingedly mounted as at 83 to the brackets 74 and it moves with said brackets as the same rotate around the shaft 77. A compression spring 84 always tends to keep the bar 82 and, consequently, the rollers 81 carried thereby in their raised position. Resistance of the spring 84 may be adjusted with the aid of the nuts 67, see Fig. 10. Means are provided whereby the bar 82 and the rollers 81 can travel through the clearance distance independently of the brackets 74 and consequently the swinging table 73. The bar 82 is connected to the pedal bar 85 hinged to the base 20 as at 86 by means of a rod 87. This connection is a positive one and, therefore, as soon as the operator steps on the pedal 33 the bar 82 and the rollers 81 begin to move down through the clearance space, also moving the workpiece away from the transfer belt 30. As soon as the rollers 81 are removed from the transfer belt for the clearance distance, a collar 88 secured on the rod 87 engages a bracket 89 through which the bar 87 is adapted to slide freely. The bracket 89 is connected by means of an adjustable rod 90 and a cross head 91 with a crank 92 secured to the shaft 77 with which the table 73 is adapted to swing. When the collar 88 engages the bracket 89, further pressure on the pedal 33 causes rotation of the crank 92 and consequently swinging of the table 73 downward against the resistance of the weight 79. When the table 73 is brought into its lowermost position, the operator moves the pedal 33 slightly to the right in order to cause the pedal bar 85 to get under the hook 93, thus locking the table 73 in its lowermost position. It will now be understood in view of the foregoing that the position of the collar 88 on the rod 87 determines the clearance distance and the same may be varied by moving said collar and fixing the same with the aid of the set screw 94 in a desired position on said bar 87.

The rollers 81 and the bar 82 carrying the same are so arranged with respect to the swinging table 73 that when a workpiece is laid flat on said table 73 the edge 80a of the workpiece is received in the grooves 81a of the rollers 81. Loading the workpiece is extremely easy when the table is in its lower position, and the workpiece is simply picked up from a pile conveniently placed with respect to the machine and put on said table 73 so as to engage the guide rollers 81 by its edge 80a. Thereupon the operator presses the pedal, moving the same slightly to the left for unlocking it from under the hook 93 and, by gradually releasing the pressure on the pedal 33, permits the weight 79 to move the table 73 into its upper position, which position is determined by the stop 95 provided on the sleeve 31, see Figs. 1 and 11, against which stop a tooth 96 is adapted to bear for stopping the table 73. As already mentioned, adjustments of the table 73 are permitted with the aid of screws 76.

Figure 11:
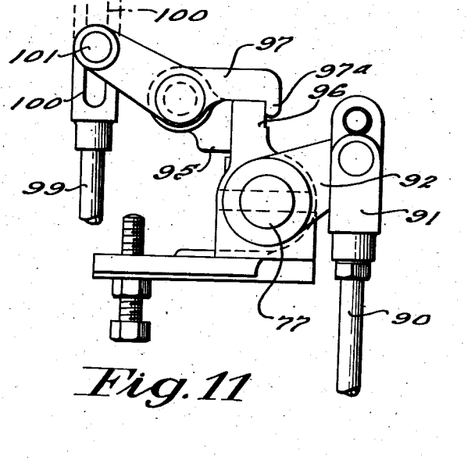
Fig. 11 illustrates the table locking means as the same appear when the table is about to be unlocked.

Means are provided for locking the swinging table 73 in its raised position, thereby preventing any undesirable movements of said table while the printing operation is in progress and providing a support for the table 73 in its raised position, which may be desirable to permit the operator to rest his elbows on the edge of the table 73 or to prevent movements of the table when the operator touches the table 73 accidentally. Said locking means are exemplified by a bell crank 97 having a hook 97a cooperating with the tooth 96 to lock the same to the stop 95 as shown in Fig. 11. To the opposite end of the bell crank 97 there is connected a spring 98 anchored on a member rigid with the sleeve 31, which spring tends to raise the straight end of the bell crank 97, to lower its hooked end and to lock the tooth 96 as explained.

Means are provided for unlocking the tooth 96 by raising the hooked end 97a of the bell crank 97 when the guide rollers 81 reach the end of the clearance distance. Said means are exemplified by a rod 99 one end of which is connected to the pedal bar 85, while its other end is provided with a head having an elongated slot 100 which is engaged by a pin 101 carried by the bell crank 97. The length of the slot 100 is determined by the length of the clearance distance. The length of the rod 99 is so selected that when the table 73 is in its raised position, the pin 101 is at the lower end of the slot 100. Therefore, when the operator applies pressure to the foot pedal 33 the bar 99 can move together with the bar 82 and rollers 81 bringing the workpiece flat on the table 73 without affecting the position of the bell crank 97 and unlocking the table 73. However, when the workpiece is brought with the aid of the guide rollers onto the supporting table 73, the pin 101 reaches the upper end of the slot 100 (which condition is illustrated in Fig. 11) and further downward movement of the pedal 33 causes raising of the hooked end 97a of the bell crank 97 and unlocking the tooth 96, permitting the table to be brought into its lower position by further application of pressure on the pedal 33 against the resistance of the weight 79.

Figure 5:
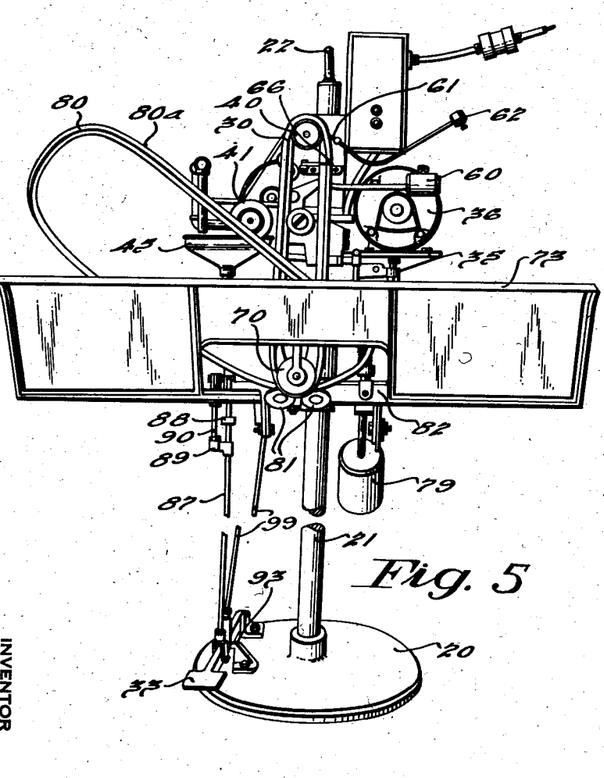
Fig. 5 is a front view of the machine, the work supporting table being shown raised with a workpiece in its operative position in the machine.
Figure 6:
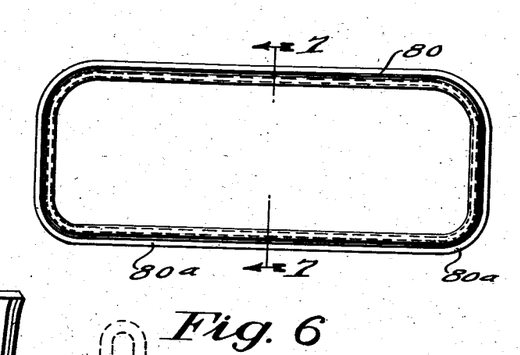
Fig. 6 is a plan view of the workpiece illustrated in Fig. 5 which workpiece is in the present case a metal window molding or frame for an automobile body.

Fig. 5 illustrates the workpiece 80 in its operative position in contact with the transfer belt 30, the table 73 being shown in its raised position. It will be understood that when the machine is running and the belt 30 contacts the workpiece 80 which runs with its edge 80a engaging the grooves 81a of the guiding rollers 81, motion of the belt itself moves the workpiece around, thus effecting continuous printing of the design on the surface thereof, and the operator has only to support said workpiece 80 and to press the pedal for dropping the workpiece 80 onto the table for breaking the contact between the transfer belt and the workpiece for stopping the printing operation. When the printing operation is completed, the operator lowers the table by continued pressure on the pedal 33. When the pedal is locked in its lowermost position, as explained, the finished workpiece is removed from the machine and a new one inserted in a similar manner.

It will be understood that the work table 73, the guide rollers 81, and the locking and unlocking means for the table 73 may be operated by separate means, such as separate pedals, in which case lost motion devices, such as slot 100 and pin 101, or collar 88 and bracket 89, may be dispensed with. However, use of a single pedal considerably simplifies the operation, since the operator does not have to move his foot from one pedal to another or to differentiate in any way the movements of a single pedal. He simply presses the pedal down and all the movements explained above are attained by the above described automatic means.

I claim:

1. In a surface ornamenting machine, a transfer member, a workpiece supporting table movable to and away from said transfer member through a predetermined stroke the near end of which is arranged so as to give a certain clearance between said workpiece and said belt, and a guide roller adapted to engage the workpiece and carried by said table through the stroke of the latter and adapted to move independently of said table through said clearance in order to establish or to break the contact between the workpiece and the transfer member.

2. In a surface ornamenting machine, a transfer member, a workpiece supporting table movable to and away from said transfer member through a predetermined stroke, the near end of which is arranged so as to give a certain clearance between said workpiece and said belt, yielding means urging said table toward said belt, manually operated means for moving said table away from said belt, a guide roller adapted to engage the workpiece and to hold the same against said belt, said roller being carried by said table through the stroke of the latter, and a lost motion connection between said roller and said table for permitting said roller to move independently of said table within the limits of said clearance in order to establish and to break the contact between the workpiece and the transfer member.

3. In a surface ornamenting machine, a transfer member, a workpiece supporting table movable to and away from said transfer member through a predetermined stroke, the near end of which is arranged so as to give a certain clearance between said workpiece and said belt, yielding means urging said table toward said belt, manually operated means for moving said table away from said belt, a guide roller adapted to engage the workpiece and to hold the same against said belt, said roller being carried by said table through the stroke of the latter, a lost motion connection between said roller and said table for permitting said roller to move independently of said table within the limits of said clearance in order to establish and to break the contact between the workpiece and the transfer member, and resilient means urging said roller toward said belt.

4. In a surface decorating machine, a transfer belt, a swingingly mounted table for supporting the workpiece, pedal means for moving said table away from said belt for loading the machine, a counterweight moving said table toward said belt, means for stopping the table at a predetermined distance from said belt, automatic means locking the table at its stop, a connection between said automatic means and said pedal for unlocking said table as the table is about to move down, a bar hingedly mounted on said table a plurality of guide rollers on said bar adapted to engage the workpiece and press the same against said belt, a spring movable with said table and urging said rollers toward said belt, a positive connection between said bar and said pedal ensuring immediate response of the rollers to the movement of said pedal, and lost motion means between said table and said pedal for movement away from said belt after the rollers have moved through a predetermined distance.

5. In a surface decorating machine, the combination of a transfer belt, a swinging table adapted to move a workpiece to said belt and support it at a predetermined clearance distance therefrom, locking means adapted to lock said table in the supporting position, a plurality of guide rollers adapted to hold the workpiece in contact with said belt and to guide said workpiece as it moves along, a manually operated member, a connection between said rollers and said member to move the rollers away from said belt for a predetermined distance, means operated by said member and adapted to unlock said table as the rollers reach the end of said distance, and a lost motion connection mounted on the connection between said rollers and said member and adapted to engage said table for movement with said rollers away from said belt as said table is unlocked and after said rollers move through said clearance distance.

6. In a surface ornamenting machine, the combination of a transfer belt, a swinging table adapted to move a workpiece up to said belt and to support it at a predetermined clearance distance therefrom, locking means adapted to lock said table in the supporting position, a plurality of guide rollers adapted to bring a portion of the workpiece in contact with said belt, a foot pedal connected to said rollers and adapted when pressed to move the rollers away from said belt and to unlock said table, and a lost motion connection on said pedal adapted to engage the table for movement away from said belt when said table is unlocked and after said rollers move through said clearance distance.

7. In a surface ornamenting machine, a transfer belt, a hinged swinging table adapted to support a workpiece in a predetermined position with respect to said belt and adapted to be moved away from said belt by being swung around its hinge support for convenient loading and unloading, a pair of guide rollers carried by said table and adapted to engage the workpiece, and a lost motion connection between said table and said rollers for allowing said rollers to move independently of said table and to bring the workpiece in contact with said belt.

8. In a surface ornamenting machine, a transfer belt, a hinged swinging table adapted to support a workpiece in a predetermined position with respect to said belt and adapted to be moved away from said belt by being swung around its hinge support for convenient loading and unloading, a pair of guide rollers carried by said table and adapted to engage the workpiece, a lost motion connection between said table and said rollers for allowing said rollers to move indepenently of said table and to bring the workpiece in contact with said belt, yielding means urging said table toward said belt, and resilient means separate from said yielding means and adapted to urge said guide roller against said workpiece.

9. In a surface ornamenting machine, a transfer belt, a hinged swinging table adapted to support a workpiece in a predetermined position with respect to said belt and adapted to be moved away from said belt by being swung around its hinge support for convenient loading and unloading, a pair of guide rollers carried by said table and adapted to engage the workpiece, a lost motion connection between said table and said rollers for allowing said rollers to move independently of said table and to bring the workpiece in contact with said belt, a counterweight urging said table toward said belt, and a spring urging said guide rollers against said workpiece.

NICHOLAS GEORGE KOPPINGER.